United States Patent [19]
Hong et al.

[11] Patent Number: 5,587,347
[45] Date of Patent: Dec. 24, 1996

[54] RAW MATERIALS FOR PRODUCING COLOR CERAMIC PRODUCTS

[75] Inventors: Jibi Hong; Jianhua Chu; Hongxiang Wu, all of Panzhihua, China

[73] Assignee: Panzhihua Iron and Steel (Group) Co., Panzhihua, China

[21] Appl. No.: 411,153

[22] Filed: Mar. 27, 1995

[30] Foreign Application Priority Data

Mar. 27, 1994 [CN] China ................. 94111695.6

[51] Int. Cl.$^6$ .................... C04B 35/453; C04B 33/14
[52] U.S. Cl. ................ 501/155; 501/141; 501/143; 501/144
[58] Field of Search ............. 501/155, 141, 501/143, 144

[56] References Cited

U.S. PATENT DOCUMENTS

| | | | |
|---|---|---|---|
| 4,085,189 | 4/1978 | Dunn, Jr. | 423/74 |
| 4,368,273 | 1/1983 | Puskas | 501/155 |
| 4,645,651 | 2/1987 | Hähn et al. | 423/62 |

FOREIGN PATENT DOCUMENTS

| | | | |
|---|---|---|---|
| 244209 | 12/1965 | Austria | 80/10 D |
| 85102464 | 3/1987 | China . | |
| 1068091A | 1/1993 | China . | |

OTHER PUBLICATIONS

V. M. Kraev and E. A. Gryadkina "Utilization of Local Raw Material and Industrial Waste in Ceramic Production", Glass and Ceramics (USA) vol. 34, No. 11–12 (Nov.–Dec.) 1977.

*Primary Examiner*—Mark L. Bell
*Assistant Examiner*—Louis M. Troib
*Attorney, Agent, or Firm*—Birch, Stewart, Kolasch & Birch, LLP

[57] ABSTRACT

The present invention has disclosed raw materials for producing color ceramic products, which is prepared by using V-bearing titanomagnetite tails obtained after ore dressing as base material with a given proportion of additives and with or without coloring agents. The total content of Fe, Ti, Co, and Ni in said base material is in a range of about 3–45% by weight. The raw materials of the present invention have the advantages of no free iron and soluble vanadium compounds contained therein, thus when they are used to produce ceramic products, they can be sintered in a wide temperature range within shorter time. The products produced therefrom have the advantages of higher strength and hardness, lower water absorption, higher corrosion resistance, and stable tints. Products with a variety of sorts and various colors can be produced by using the raw materials of the present invention.

14 Claims, No Drawings

RAW MATERIALS FOR PRODUCING COLOR CERAMIC PRODUCTS

FIELD OF THE INVENTION

The present invention relates to raw materials for producing color ceramic products, particularly relates to raw materials for producing color ceramic products with iron oxides and titanium oxides as the base material thereof.

BACKGROUND OF THE INVENTION

V-bearing titanomagnetite tails obtained after ore dressing are different from vanadium extraction tails and high titanium-content slags from blast furnace. They are a metallurgical waste which is very difficult to dispose of, and it is also a pollutant source resulting in serious environmental pollution. For example, since Panzhihua Iron and Steel (Group) Co. of China has been in production for 20 years, such tails discharged have amounted to more than 96 million tons. They not only polluted some of the river valley along the Jinshajiang River to the upper reaches of the Yangzi River, but also occupied a large area of land for storage.

Before the present invention, there have not been any methods for utilizing the V-bearing titanomagnetite tails obtained after ore dressing. Chinese patent application No. CN 85102464 discloses the utilization of waste residue obtained after vanadium-extraction by the method of atomization to produce the raw materials for ferrous metal oxide ceramic products and for black ceramic products manufactured by using said raw materials. Said raw materials are produced by using the industrial waste residue of natural ore having a total content of titanium, vanadium, chromium, manganese and iron over 20% by weight, or the industrial waste residue of natural ore having a total content of titanium, vanadium, chromium, and manganese over 30% by weight as base material, with or without additives. In particular, said industrial waste residues are the waste residue from vanadium-extraction or sintered slags from sulfurous iron ore and chromium slags. Using the raw materials as described in said patent application, only black ferrous metal oxide ceramics can be made. If they are used to produce architectural decorative preparations, their physical and chemical properties are superior to those of natural granite. However, they have the defects of dull coloring, high product density, obvious contraction during the sintering process, etc.

There are also literatures which report the utilization of waste slags from a blast furnace to manufacture raw materials for color ceramic products. For example, Chinese patent application No. CN 91107240.3 discloses a raw material for producing color ceramic products. The raw material is produced by using blast furnace slags containing 5–30% by weight $TiO_2$ as base material, with or without additives and with or without coloring agents. The technical solution of said application has overcome the defects of low activity and difficulty of using blast furnace slag containing 5–30% by weight $TiO_2$, which makes a $TiO_2$ base material which is both colored and colors other material, and allows the base material to coordinate with additives or/and coloring agents. Therefore, metal oxide colored ceramic products having a series of colors can be prepared. When said raw materials are used for producing architectural decorative products, they also show better physical and chemical properties than those of natural granite. However, they can be sintered into the desired products only in a narrow temperature range, and tend to develop color differences during the sintering process. In addition, the blast furnace slags used as base material contain a lot of free iron and more soluble vanadium compounds (vanadates), and the shortcomings of this will be described hereinafter.

These two technical solutions of the above-mentioned applications, i.e., Chinese patent application Nos. CN 85102464 and CN 91107240.3 have their individual advantages and shortcomings, respectively. However, the raw materials for ceramic products described in these two applications have following common shortcomings.

1. The base materials contain more free iron. For example, the base material of CN 85102464 contains 3–5% by weight free iron and the base material of CN 91107240.3 contains 1–5% by weight free iron. The presence of free iron will prolong the duration of ball-milling of the base materials or the duration of processing. In addition, the products tend to bubble and/or form concavity during the sintering process. Finally, the products produced therefrom tend to crack during the cooling process.

2. The base materials contain more soluble vanadium compounds. The vanadium content of the base materials of CN 85102464 and CN 91107240.3 are in the range of 1–6% by weight, calculated on the basis of vanadium pentoxide, wherein, the former contains more than 0.55% by weight of soluble vanadium (vanadate) and the later contains more than 0.22% by weight of soluble vanadium(vanadate). During the sintering process, vanadium pentoxide and other high valence vanadium compounds decompose into low valence vanadium, and thus release oxygen, causing bubbles in the final products.

3. The base materials contain a certain quantity of sodium salt and potassium salt. Calculated on the basis of $Na_2O$ and $K_2O$, the content of soluble sodium salts (sodium vanadate and sodium carbonate) is about 1–2% by weight and the content of soluble potassium salts (potassium vanadate and potassium carbonate) is more than 0.04% by weight. The presence of soluble sodium salts and potassium salts will result in cracks in the final products.

OBJECTS OF THE INVENTION

One object of the present invention is to utilize V-bearing titanomagnetite tails obtained after ore dressing as a base material for producing color ceramic products.

Another object of the present invention is to provide raw materials for producing color ceramic products by using V-bearing titanomagnetite tails obtained after ore dressing, i.e. using the V-bearing titanomagnetite tails containing iron, titanium, cobalt and nickel as a base material, adding a certain proportion of additives, and optionally adding a coloring agent. The raw materials for producing color ceramic products of the present invention not only have no free elements, such as iron, but also possess superior properties to those of natural granite.

SUMMARY OF THE INVENTION

The present invention relates to raw materials for producing color ceramic products, which are prepared by using V-bearing titanomagnetite tails containing iron, titanium, cobalt and nickel as a base material, adding a certain proportion of additives and optionally adding a coloring agent, wherein, the total content of iron, titanium cobalt and nickel is in the range of about 3–45% by weight.

DETAILED DESCRIPTION OF THE INVENTION

The present invention relates to raw materials for producing color ceramic products, and particularly relates to the raw materials utilizing V-bearing titanomagnetite tails obtained after ore dressing containing iron, titanium, cobalt and nickel as base material.

Specifically, the present invention relates to raw materials for producing color ceramic products, which contain:

(1) 20–85% by weight V-bearing titanomagnetite tails obtained after ore dressing, wherein the total content of iron, titanium, cobalt and nickel is in the range of about 3–45% by weight, and said iron, titanium, cobalt and nickel are present in the forms of titanomagnetite, ilmenite, titanaugite, plagioclase and sulfides;

(2) 15–80% by weight additives;

(3) 0–15% by weight coloring agent.

It is preferred that, in the base material used in the raw materials for producing color ceramic products of the present invention, the total content of iron, titanium, cobalt and nickel is in the range of about 5–25% by weight, wherein, said iron, titanium, cobalt and nickel are present in the forms of titanomagnetite, ilmenite, titanaugite, plagioclase and sulfides.

According to the present invention, said additives as used in the raw materials for producing color ceramic products are two or more selected from the group consisting of red clay, white mud, and black mud. The compositions of red clay, white mud, and black mud are as follows, respectively:

(1) red clay: 50–60% SiO, 16–20% $Al_2O_3$, 8–15% $Fe_2O_3$, 0.2–10% CaO, 0.5–2% MgO, 0.3–3% $TiO_2$, balance trace elements and impurities, the ignition loss of red clay is 6–15%, all the percentages being weight percentages;

(2) white mud: 50–58% $SiO_2$, 25–30% $Al_2O_3$, CaO (trace), 0.5–2% MgO, 0.5–3% $TiO_2$, 0.5–3% $Fe_2O_3$, MnO (trace), balance trace elements and impurities, the ignition loss of white mud is 10–15%, all the percentages being weight percentages;

(3) black mud: 50–55% $SiO_2$, 28–36% $Al_2O_3$, 0.5–2% $Fe_2O_3$, 0.3–1% CaO, 0.3–1% MgO, 0.5–2% titanium oxides, balance trace elements and impurities, the ignition loss of black mud is 10–15%, all the percentages being weight percentages.

According to the present invention, the coloring agent as used in the raw materials for producing color ceramic products is selected from the group consisting of Cr, Sn, Sb and Mn.

The raw materials of the present invention can be sintered to obtain color ceramic products by using a conventional ceramics sintering process.

It is particularly favorable that, according to the present invention, color ceramic products having different colors can be produced by adjusting the amounts of base material and the additives in said raw materials.

For example, the composition of the raw material for producing a ceramic having Venetian red color is as follows: 40–70% by weight base material, 20–60% by weight red clay and 5–10% by weight white mud.

The composition of the raw material for producing a ceramic having purple color is: 20–50% by weight base material, 40–60% by weight red clay and 10–20% by weight black mud.

The composition of the raw material for producing a ceramic having coffee color is: 30–60% by weight base material, 10–30% by weight red clay and 20–40% by weight black mud.

The composition of the raw material for producing a ceramic having gray color is: 50–80% by weight base material, 10–30% by weight black mud and 10–30% by weight white mud.

Furthermore, by adding a coloring agent into the raw materials for producing color ceramics of the present invention, ceramic products having various bright colors can be obtained by using a conventional sintering process.

For example, the composition of the raw material for producing a ceramic having umbrinaceous color is: 50–80% by weight base material, 10–30% by weight red clay, 5–20% by weight black mud and 5–20% by weight white mud, and 0.05–1% by weight Cr as coloring agent.

The composition of the raw material for producing a ceramic having green color is: 30–70% by weight base material, 10–30% by weight black mud, 10–30% by weight white mud and 0.2–1% by weight Sn as coloring agent.

The composition of the raw material for producing a ceramic having yellow color is 50–70% by weight base material, 10–30% by weight black mud, 10–30% by weight white mud, and 0.2–1% by weight Sn as coloring agent.

Another composition of the raw material for producing a ceramic having yellow color is: 50–70% by weight base material, 5–10% by weight red clay, 10–30% by weight black mud, 10–30% by weight white mud, and 0.05–1% by weight Sn as coloring agent.

The composition of the raw material for producing a ceramic having black color is: 40–70% by weight base material, 10–40% by weight black mud, 10–30% by weight white mud, and 1–10%; by weight Mn as coloring agent.

According to the present invention, the chemical composition of the V-bearing titanomagnetite tails as used is: 4–22% $Fe_2O_3$, 3–12% $TiO_2$, 0.01–0.3% CoO, 0.005–1% NiO, 30–45% $SiO_2$, 10–25% $Al_2O_3$, 2–15% CaO and 2–10% MgO with the remainders being trace elements or oxides thereof and impurities, the percentages being weight percentages. The base material as used in the raw materials of the present invention is the V-bearing titanomagnetite tails obtained after ore dressing, which has been pulverized into powder having particle size equal to or less than 0.04 mm.

The process for preparing the raw materials for producing color ceramic products of the present invention is as follows:

dewatering and drying the V-bearing titanomagnetite tails obtained after ore dressing having a particle size equal to or less than 0.04 mm;

pulverizing the additives to a powder having a particle size less than 0.06 mm; and if necessary, pulverizing the coloring agent to a powder having a particle size less than 0.06 mm;

mixing the V-bearing titanomagnetite tails and additive powders thus obtained, and if necessary together with the obtained coloring agent powder, and milling the mixture in a ball mill for about 5–10 hours to obtain the raw materials for producing color ceramic products having a particle size equal to or less than 0.04 mm.

Compared with the prior art, the present invention has following clear advantages:

1. No free iron is contained in the base material, and the iron contained therein is present in the forms of titanomagnetite, ilmenite, etc. Therefore, the formation of bubbles and cavities in the products during the sintering process, and the cracks of the products during the cooling process due to the presence of free iron, can be effectively avoided. In addition, as mentioned above, the base material of the present invention has been milled to a powder having a particle size equal to or less than 0.04 mm, which can meet the requirements for the production of fine ceramics. Ball milling is conducted mainly to mix the base material with various coloring agents and additives. Therefore, the milling duration can be decreased to within 10 hours. However, the milling duration of raw materials for producing ceramics in a common ceramic plant usually lasts for about 20–40 hours.

2. The base material of the present invention contains trace vanadium which is present in the form of insoluble spinel. Therefore, the bubbles formed during the sintering process due to the decomposition of vanadium pentoxide to low valence vanadium compounds can be substantially decreased.

3. The base material contains no soluble compounds of sodium and potassium. Sodium and potassium present in the base material is in the form of insoluble plagioclase. Therefore, the cracks in the products can be prevented, and the sintering temperature is decreased.

4. In the base materials, Fe and Ti mainly have the effect of being the skeleton of the product, while Co and Ni mainly have the effect of being fluxing agents. Meanwhile, Fe, Ti, Co and Ni constitute jointly a stable coloring base material. Therefore, the products produced from the raw materials of the present invention have the properties of high strength and hardness, low water absorption, strong corrosion resistance, etc., which are superior to those of natural granite. In addition, the products produced from the raw materials of the present invention have the characteristics of stable tints, and can be produced in a variety of forms and colors.

5. The present invention utilizes industrial wastes, which provides a means to solve the problems of storage of industrial wastes and environmental pollution, turning harm into benefit.

6. When the raw materials of the present invention is sintered to produce ceramic products, it can be sintered in a wide temperature range, i.e., 1120°–1160° C. (the sintering temperature range of Chinese patent application No. CN 85102464 is 1100°–1120° C.) with a sintering duration within 50 minutes.

The raw materials for producing ceramic products of the present invention use V-bearing titanomagnetite tails obtained after ore dressing, the total content of iron, titanium, cobalt and nickel in the raw materials is in the range of 3–45% by weight, preferably in the range of 5–23% by weight. The chemical composition of the base materials is: 4–22% $Fe_2O_3$, 3–12% $TiO_2$, 0.01–0.3% CoO, 0.005–1% NiO, 30–45% $SiO_2$, 10–25% $Al_2O_3$, 2–15% CaO and 2–10% MgO with the remainders being trace elements or oxides thereof and impurities, the percentages being weight percentages. It can be seen from the data shown above that the raw materials for producing color ceramic products of the present invention contain no free iron, and iron is present in the form of oxides thereof. In addition, vanadium, potassium and sodium are present in the forms of insoluble spinel and plagioclase respectively. It has been proved by facts that the presence of insoluble compounds of vanadium, potassium and sodium is favorable for the production of ceramic products.

In the raw materials for producing color ceramic products of the present invention, the added additives are:

(1) red clay, the composition thereof is: 52–60% $SiO_2$, 16–20% $Al_2O_3$, 8–15% $Fe_2O_3$, 0.2–10% CaO, 0.5–2% MgO, 0.3–3% $TiO_2$, balance trace elements and impurities, the ignition loss of red clay is 6–15%, all the percentages being weight percentages;

(2) white mud, the composition thereof is: 50–58% $SiO_2$, 25–30% $Al_2O_3$, CaO (trace), 0.5–2% MgO, 0.5–3% $TiO_2$, 0.5–30% $Fe_2O_3$, MnO (trace), balance trace elements and impurities, the ignition loss of white mud is 10–15%, all the percentages being weight percentages;

(3) black mud, the composition thereof is: 50–55% $SiO_2$, 28–36% $Al_2O_3$, 0.2–2% $Fe_2O_3$, 0.3–1% CaO, 0.3–1% MgO, 0.5–2% titanium oxides, balance trace elements and impurities, the ignition loss of black mud is 10–15%, all the percentages being weight percentages.

The coloring agent is one selected from the group consisting of Cr, Sn, Sb and Mn.

The present invention will be further explained by the following examples. However, these examples should be understood to explain but not to limit the present invention.

Example 1 Production of ceramic having Venetian red color

The V-bearing titanomagnetite tails (called "base material" hereafter) obtained after ore dressing with particle size equal to less than 0.04 mm were dewatered and dried. Red clay and white mud was pulverized to particles with particle size of less than 0.06 mm. Then the obtained powders were added into a ball mill in accordance with a weight ratio of base material:red clay:white mud=40:55:5 and milled for 8 hours until a powder mixture having a particle size equal to or less than 0.04 mm was obtained. The obtained powder mixture was made into a desired billet in accordance with the conventional process in the ceramic field. Then, the billet was sintered in a roller hearth tunnel or the like under oxidizing atmosphere at 1130° C. for 50 minutes. In this way, a ceramic product having Venetian red color was obtained.

Examples 2–8

Ceramic products having different colors were made by the same method as described in Example 1, and the compositions of the raw materials as used are shown in Table 1.

TABLE 1*

| Example | Base mat. | Red clay | White mud | Black mud | Color of products | Firing temp. C.° | Time of ball milling |
| --- | --- | --- | --- | --- | --- | --- | --- |
| 2 | 60 | 30 | 10 | — | Venetian red | 1150 | 6 h. |
| 3 | 30 | 60 | — | 10 | dark reddish purple | 1140 | 10 h. |
| 4 | 40 | 40 | — | 20 | dark reddish purple | 1140 | 8 h. |
| 5 | 30 | 30 | — | 40 | coffee | 1130 | 6 h. |
| 6 | 60 | 20 | — | 20 | coffee | 1160 | 5 h. |
| 7 | 60 | — | 25 | 15 | gray | 1140 | 6 h. |
| 8 | 70 | — | 10 | 20 | gray | 1150 | 6 h. |

*The usages of various components are expressed in weight parts.

Examples 9–16

Ceramic products having different colors were made by the same method as described in Example 1, with the exception that a coloring agent was added. The compositions of the raw materials as used are shown in Table 2.

TABLE 2*

| Exam. | Base mat. | Red clay | White mud | Black mud | Coloring agents | Color of products |
| --- | --- | --- | --- | --- | --- | --- |
| 9 | 55 | 20 | 10 | 15 | 0.1 Cr | umbrinaceous |
| 10 | 65 | 10 | 15 | 10 | 0.1 Cr | umbrinaceous |
| 11 | 50 | — | 20 | 30 | 0.1 Sn | Green |
| 12 | 65 | — | 20 | 15 | 0.1 Sn | Green |
| 13 | 50 | 5 | 25 | 20 | 0.1 Sb | Yellow |
| 14 | 65 | 5 | 25 | 20 | 0.1 Sb | Yellow |
| 15 | 50 | — | 20 | 30 | 5 Mn | Black |
| 16 | 60 | — | 15 | 25 | 3 Mn | Black |

*The usages of various components are expressed in weight parts.

What we claimed is:

1. A raw material for producing a colored ceramic product, comprising:

(1) a base material comprising 20–85% by weight of a V-bearing titanomagnetite tail obtained after ore dressing, wherein the total content of iron, titanium, cobalt and nickel of said tail is in the range of 3–45% by weight, based upon the weight of said base material, said iron, titanium, cobalt and nickel are present as titanomagnetite, ilmenite, titanaugite, plagioclase and/or sulfides; and trace amounts of vanadium in the form of insoluble spinel;

(2) 15–80% by weight, based upon the weight of said raw material, of at least two additives selected from the group consisting of red clay, white mud, and black mud; and (3) 0–10% by weight, based upon the weight of said raw material, of a coloring agent.

2. The raw material of claim 1, wherein the chemical composition of said base material consists essentially of: 4–22% $Fe_2O_3$, 3–12% $TiO_2$, 0.01–0.3% CoO, 0.05–1% NiO, 30–45% $SiO_2$, 10–25% $Al_2O_3$, 2–15% CaO and 2–10% MgO, wherein the percentages are weight percentages, based upon the total weight of base material.

3. The raw material of claim 2, wherein said base material may contain sodium and potassium in the form of insoluble plagioclase.

4. The raw material of claim 1, wherein the total content of iron, titanium, cobalt and nickel in the base material is in the range of 5–23% by weight, based upon the weight of said base material.

5. The raw material of claim 1, wherein, (1) said red clay consists essentially of: 52–60% $SiO_2$, 16–20% $Al_2O_3$, 8–15% $Fe_2O_3$, 0.2–10% CaO, 0.5–2% MgO and 0.3–3% $TiO_2$, and the ignition loss of said red clay is 6–15%, wherein all the percentages are weight percentages;

(2) said white mud consists essentially of: 50–58% $SiO_2$, 25–30% $Al_2O_3$, 0.5–2% MgO, 0.5–3% $TiO_2$ and 0.5–3% $Fe_2O_3$, and the ignition loss of said white mud is 10–15%, wherein all the percentages are weight percentages; and (3) said black mud consists essentially of: 50–55% $SiO_2$, 28–36% $Al_2O_3$, 0.5–2% $Fe_2O_3$, 0.3–1% CaO, 0.3–1% MgO and 0.5–2% titanium oxides, and the ignition loss of said black mud is 1.0–15%, wherein all the percentages are weight percentages.

6. The raw material of claim 1, wherein said coloring agent is selected from the group consisting of Cr, Sn, Sb and Mn.

7. The raw material of claim 1, wherein the amount of said base material is in the range of 40–70% by weight, the amount of said red clay is in the range of 20–60% by weight, and the amount of said white mud is in the range of 5–10% by weight, based upon the weight of said raw material.

8. The raw material of claim 1, wherein the amount of said base material is in the range of 20–50% by weight, the amount of said red clay is in the range of 40–60% by weight, and the amount of said black mud is in the range of 10–20% by weight, based upon the weight of said raw material.

9. The raw material of claim 1, wherein the amount of said base material is in the range of 30–60% by weight, the amount of said red clay is in the range of 10–30% by weight, and the amount of said black mud is in the range of 20–40% by weight, based upon the weight of said raw material.

10. The raw material of claim 1, wherein the amount of said base material is in the range of 50–80% by weight, the amount of said black mud is in the range of 10–30% by weight, and the amount of said white mud is in the range of 10–30% by weight, based upon the weight of said raw material.

11. The raw material of claim 5, wherein the amount of said base material is in the range of 50–80% by weight, the amount of said red clay is in the range of 10–30% by weight, the amount of said black mud is in the range of 5–20% by weight, the amount of said white mud is in the range of 5–20% by weight, said coloring agent is Cr and the amount thereof is in the range of 0.05–1% by weight, wherein said weight percents are based upon the weight of said raw material.

12. The raw material of claim 5, wherein the amount of said base material is in the range of 30–70% by weight, the amount of said black mud is in the range of 10–30% by weight, the amount of said white mud is in the range of 10–30% by weight, said coloring agent is Sn and the amount thereof is in the range of 0.2–1% by weight, wherein said weight percents are based upon the weight of said raw material.

13. The raw material of claim 5, wherein the amount of said base material is in the range of 50–70% by weight, the amount of said red clay is in the range of 5–10% by weight, the amount of said black mud is in the range of 10–30% by weight, the amount of said white mud is in the range of 10–30% by weight, said coloring agent is Sb and the amount thereof is in the range of 0.05–1% by weight, wherein said weight percents are based upon the weight of said raw material.

14. The raw material of claim 5, wherein the amount of said base material is in the range of 40–70% by weight, the amount of said black mud is in the range of 10–40% by weight, the amount of said white mud is in the range of 10–30% by weight, said coloring agent is Mn and the amount thereof is in the range of 1–10% by weight, wherein said weight percents are based upon the weight of said raw material.

* * * * *